Sept. 29, 1964 C. E. JONES ETAL 3,151,226

PLURAL MAGNETIC REED SWITCH

Filed Jan. 11, 1962

INVENTORS
C.E. JONES
E.H. SHOLL

BY Young & Quigg

ATTORNEYS

United States Patent Office 3,151,226
Patented Sept. 29, 1964

3,151,226
PLURAL MAGNETIC REED SWITCH

Charles E. Jones and Edward H. Sholl, Bartlesville, Okla., assignors to Phillips Petroleum Company, a corporation of Delaware Filed Jan. 11, 1962, Ser. No. 165,491
7 Claims. (Cl. 200—87)

This invention relates to plural circuit actuation. In one aspect the invention relates to a multicircuit switch. In another aspect the invention relates to a method for individually actuating a plurality of circuits.

There are many instances in which it is necessary to control a plurality of electrical circuits and it is often desirable or necessary that such circuits be controlled with heremetically sealed switches, that they be controlled from a central location, and that the controlling means be as compact as possible for efficient utilization of space. For example, in some instances it is necessary to preselect factors to be programmed into a control system, the factors selected from a plurality of those available. Since such units are used to control processes involving inflammable fluids, it is desired that the control be by means of hermetically sealed switches. On the other hand, since space available for installation of controls often is limited, it is desirable that the plural selection apparatus be made as compact as possible.

An object of this invention is to control a plurality of electrical circuits.

Another object of this invention is to provide compact plural switching apparatus.

Another object of this invention is to provide a method for individually actuating a plurality of electrical circuits.

Other aspects, objects and the advantages of our invention are apparent in the written description, the drawing and the claims.

According to our invention, there is provided a method for controlling plural electrical circuits by arranging magnetically-actuated switches in position to be actuated by revolving a source of magnetic force. Further according to our invention, a plurality of electrical circuits are individually actuated by arranging a plurality of magnetically-actuated switches in a circular pattern and revolving an actuating magnet within the circular pattern. Further according to our invention, a plurality of electrical circuits are individually actuated by arranging a plurality of magnetically-actuated switches in a circular pattern around an axis, the actuating means of some of the switches being aligned with respect to one plane perpendicular to the axis while the actuating means of others of the switches are aligned with respect to a different plane perpendicular to the axis so that different groups of switches can be actuated by different sources of magnetic force revolving about the axis.

Also according to our invention, there is provided apparatus for actuating plural electrical circuits comprising a plurality of magnetically-actuated switches positioned circumferentially around an axis and a magnet which can be rotated around the axis adjacent the switches. Further according to our invention, there is provided plural switching-apparatus wherein a plurality of hermetically-sealed magnetic switches are located circumferentially around an axis, some of the switches being aligned with respect to a plane perpendicular to the axis while others of the switches are aligned with respect to a different plane perpendicular to the axis, and a first magnetic means adapted to rotate about the axis in the vicinity of the one group of switches and another magnetic means adapted to rotate about the axis in the vicinity of the other group of switches.

Figure 1:
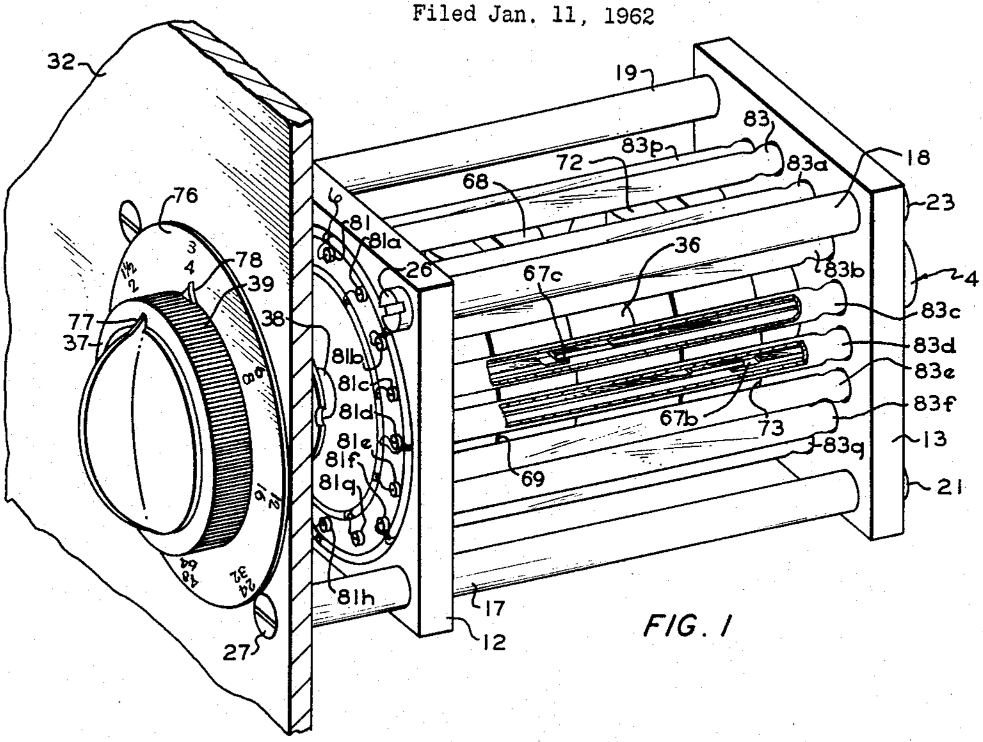
FIGURE 1 is a dimetric view of a rotary switching mechanism according to our invention.
Figure 2:
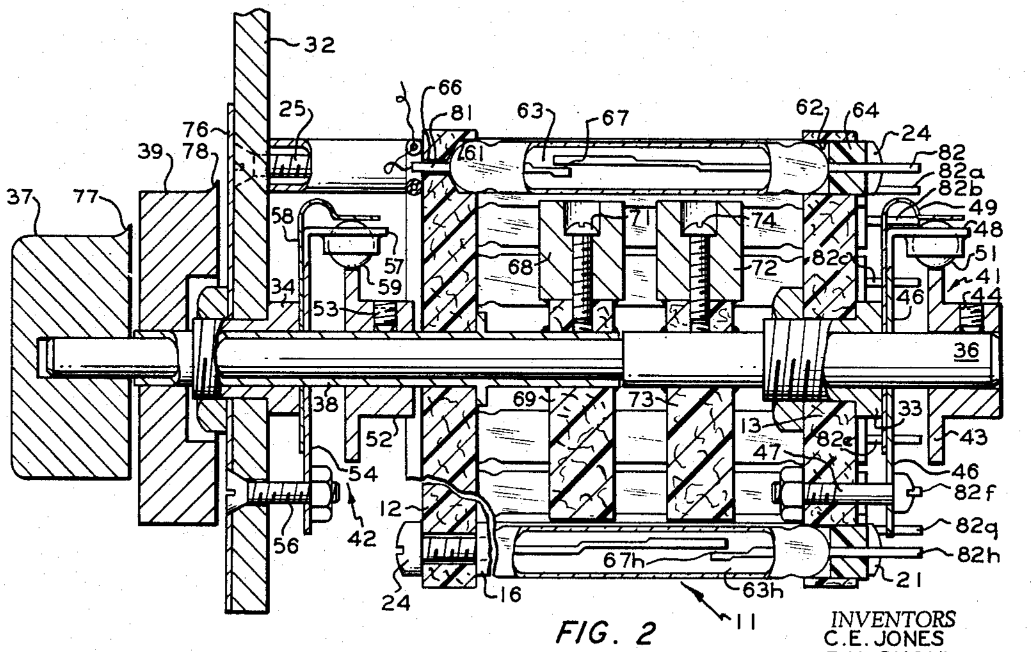
FIGURE 2 is a vertical cross section of the apparatus of FIGURE 1.

The rotary switch apparatus illustrated in the drawing comprises a frame 11, including a front plate 12, a rear plate 13 and four threaded spacers 16, 17, 18 and 19, held together with bolts 21, 22, 23, 24, 25, 26 and 27. Bolts 25 and 27, in addition to holding frame 11 together, also attach this assembly to a base plate 32. Since they are tied rigidly together the entire supporting apparatus, including base plate 32, can logically be called a frame and the word frame in the claims is broad enough to include such a structure, although this word has been applied specifically in the description to the assembly including front and rear plates 12 and 13, spacers 16, 17, 18 and 19, and the attaching bolts.

A bearing 33 is provided in rear plate 13 and a similar bearing 34 is provided in base plate 32. Each bearing comprises a threaded bushing and an attaching nut. An inner shaft 36 is supported in rear bearing 33 and extends forward and a knob 37 is attached to the front thereof. An outer shaft 38 surrounds a forward portion of shaft 36 and is supported in bearing 34. In the specific apparatus illustrated in the drawing, outer shaft 38 also is supported in front plate 12 which therefore acts as a bearing at this point. However, it is not necessary that, in all instances, this outer shaft be provided with two support points since the inner and outer shaft conjointly support each other. For example, front plate 12 can be moved somewhat forward to make room for an indexing assembly and an index plate mounted thereon for use without base plate 32. Knob 39 is attached to the outer end of the shaft 38.

In the rotary switching apparatus illustrated, a first index assembly 41 is provided at the rear of rear plate 13 and a second index assembly 42 is provided at the rear of base plate 32. Index assembly 41 comprises a cam plate 43 mounted on shaft 36 and held in place by set screw 44, a plate 46 held to prevent rotation by bolt 47 to a hole in rear plate 13 and supporting a ball retainer 48, and a flat spring 49 pressing against a detent ball 51. Similarly, index assembly 42 comprises cam plate 52 held in place by set screw 53, plates 54 held by bolt 56 and supporting ball retainer 57, a flat spring 58 and detent ball 59.

Front plate 12 is provided with a plurality of circular recesses 61 while rear plate 13 is provided with an equal number of drilled openings 62. A plurality of magnetic reed switches 63 are held in place by insertion of one end into a recess 61 and the other end into a drilled opening 62 and by a retainer bushing 64. Smaller drilled openings 66 are provided for the connecting wire from one end of each switch. Alternate switches are oriented in opposite directions so that their actuating contacts can be actuated by magnets which are spaced axially along the central shafts. For example, the contacts 67C are nearer to front plate 12 than to rear plate 13, while contacts 67B are nearer to rear plate 13 than to front plate 12, and the switches are alternated around the circumference. By alternating the switches in this manner, it is possible to place a relatively large number of them in a relatively small diameter circular pattern while still maintaining sufficient separation to permit individual actuation by the actuating magnets. A magnet 68 is held by a magnet wheel 69 fastened to outer shaft 38 by set screw 71, while a magnet 72 is held by magnet wheel 73 to shaft 36, held in place by set screw 74. Magnet 68 thus is positioned to actuate those switches having their contacts 67 forward of the midpoints of the switches, while magnet actuates those switches having their contacts 67 located rearward of the longitudinal midpoint of the switches. By proper choice of switches, magnet size and switch spacing, the switches can be made to operate as make-before-break or break-before-make. Without alternating the contact location and using more than one magnet, however, there is a definite limitation as to the minimum spacing between switches to prevent interfering action as the magnet is rotated although, of course, an operative rotary switching mechanism can be constructed.

Index plate 76 is held in place on base plate 32 by the nut of bushing 34 and by bolt 56. This plate is provided with indicia which cooperate with index line 77 of knob 37 and index line 78 of knob 39 to indicate the proper choice of circuits. For example, in the plate illustrated, the numbers correspond with program motor speeds, index line 77 indicating a programmer speed which is utilized during part of a cycle while index line 78 indicates a speed used during the remainder of the cycle, a logic circuit in the programmer determining the time of actuation of each programmer speed, the actual speed being the reciprocal of the numbers indicated, the numbers indicating minutes per revolution.

In the switch illustrated, front and rear plates 13 are made of a laminated, plastic-impregnated cloth such as linen base Synthane, manufactured by the Synthane Corporation, Oaks, Pennsylvania, threaded spacers 16, 17, 18 and 19 are made from brass rod, hollow spacers 29 and 31 are made of small diameter steel pipe, and inner shaft 36 is made of brass, while outer shaft 38 is a stainless steel. Cam plates 43 and 52 are made of stainless steel, while the same type of linen base Snythane used for the plates 12 and 13 is used for the magnet wheels 69 and 73. Retainer bushings 64 have been made with the diameter slightly larger than the drilled opening 62 and these bushings were made of a solid polytetrafluoroethylene which has sufficient resiliency that it may be forced tightly into the openings and thus retain the switch.

The knobs 37 and 39 were made of clear anodized aluminum.

Suitable switches for use as the magnetic reed switches 63 are the magnetic switches MR–800 manufactured by the Gordos Corporation, Bloomfield, New Jersey.

In operation a plurality of circuits are connected to the switches 63 which are, as illustrated, arranged in a circular pattern and the actuating magnet revolves within the circular pattern to actuate the desired switch.

Reasonable variation and modification are possible within the scope of our invention which sets forth method and apparatus for individually actuating a plurality of electrical circuits by arranging a plurality of magnetically-actuated switches in a circular pattern and revolving an actuating magnet within the circular pattern, and further by arranging the magnetically-actuated switches so that alternate switches are actuated by axially spaced magnets.

We claim:

1. A rotary switching mechanism comprising:
a frame;
an inner shaft rotatably supported in said frame;
an outer shaft surrounding a portion of said inner shaft concentric therewith and rotatably supported in said frame;
a first magnet attached to said inner shaft and removed from the axis thereof;
a second magnet attached to said outer shaft removed from the axis thereof;
a first group of hermetically-sealed magnetic reed switches supported by said frame, equidistant from the axis of said shaft and parallel with said axis, each switch of said first group having its contacts located forward of its longitudinal midpoint in position to be acutated by said second magnet and being located at one of a plurality of locations equally spaced circumferentially;
a second group of hermetically-sealed magnetic reed switches supported by said frame, equidistant from the axis of said shaft and parallel with said axis, each switch of said second group having its contacts located rearward of its longitudinal midpoint in position to be actuated by said first magnet and being located at one of a plurality of locations equally spaced circumferentially, the locations for switches of said second group being positioned equal circumferential distances from the two adjacent locations for switches of said first group;
a first actuator to position said first magnet by rotation of said inner shaft; and
a second actuator to position said second magnet by rotation of said outer shaft.

2. A rotary switching mechanism comprising:
a frame;
an inner shaft rototably supported in a first bearing at the rear of said frame;
an outer shaft rotatably supported in a second bearing at the front of said frame, said outer shaft surrounding a portion of said inner shaft concentric therewith, said inner shaft and said outer shaft conjointly supporting each other;
a first magnet attached to said inner shaft removed from the axis thereof;
a second magnet attached to said outer shaft removed from the axis thereof;
a first group of hermetically-sealed magnetic reed switches supported by said frame, equidistant from the axis of said shaft and parallel with said axis, each switch of said first group having its contacts located forward of its longitudinal midpoint in position to be actuated by said second magnet and being located at one of a plurality of locations equally spaced circumferentially;
a second group of hermetically-sealed magnetic reed switches supported by said frame, equidistant from the axis of said shaft and parallel with said axis, each switch of said second group having its contacts located rearward of its longitudinal midpoint in position to be actuated by said first magnet and being located at one of a plurality of locations equally spaced circumferentially, the locations for switches of said second group being positioned equal circumferential distances from the two adjacent locations for switches of said first group;
a first actuator to position said first magnet by rotation of said inner shaft; and
a second actuator to position said second magnet by rotation of said outer shaft.

3. A rotary switching mechanism comprising:
a frame;
an inner shaft rotatably supported in a first bearing at the rear of said frame;
an outer shaft rotatably supported in a second bearing at the front of said frame, said outer shaft surrounding a portion of said inner shaft concentric therewith, said inner shaft and said outer shaft conjointly supporting each other;
a first magnet attached to said inner shaft removed from the axis thereof;
a second magnet attached to said outer shaft removed from the axis thereof;
a first group of hermetically-sealed magnetic reed switches supported by said frame, equidistant from the axis of said shaft and parallel with said axis, each switch of said first group having its contacts located forward of its longitudinal midpoint in position to be actuated by said second magnet and being located at one of a plurality of locations equally spaced circumferentially;
a second group of hermetically-sealed magnetic reed switches supported by said frame, equidistant from the axis of said shaft and parallel with said axis, each switch of said second group having its contacts located rearward of its longitudinal midpoint in position to be actuated by said first magnet and being located at one of a plurality of locations equally spaced circumferentially, the locations for switches of said second group being positioned equal circumferential distances from the two adjacent locations for switches of said first group;
a first actuator to position said first magnet by rotation of said inner shaft;
a second actuator to position said second magnet by rotation of said outer shaft;
a first index assembly at the rear of said frame to bias said inner shaft into a plurality of stable positions at each of which said first magnet is located adjacent one of said locations for switches of said second group; and
a second index assembly at the front of said frame to bias said outer shaft into a plurality of stable positions at each of which said second magnet is located adjacent one of said locations for switches of said first group.

4. A rotary switching mechanism comprising:
a frame;
an inner shaft rotatably supported in a first bearing at the rear of said frame;
an outer shaft rotatably supported in a second bearing at the front of said frame, said outer shaft surrounding a portion of said inner shaft concentric therewith, said inner shaft and said outer shaft conjointly supporting each other;
a first magnet attached to said inner shaft removed from the axis thereof;
a second magnet attached to said outer shaft removed from the axis thereof;
a first group of hermetically-sealed magnetic reed switches supported by said frame, equidistant from the axis of said shafts and parallel with said axis, each switch of said first group having its contacts located forward of its longitudinal midpoint in position to be actuated by said second magnet and being located at one of a plurality of locations equally spaced circumferentially;
a second group of hermetically-sealed magnetic reed switches supported by said frame, equidistant from the axis of said shaft and parallel with said axis, each switch of said second group having its contacts located rearward of its longitudinal midpoint in position to be actuated by said first magnet and being located at one of a plurality of locations equally spaced circumferentially, the locations for switches of said second group being positioned equal circumferential distances from the two adjacent locations for switches of said first group;
a first actuator to position said first magnet by rotation of said inner shaft;
a second actuator to position said second magnet by rotation of said outer shaft;
an index line on said first actuator;
an index line on said second actuator;
an index plate having markings whereby said index lines indicate which of said switches is actuated by said magnet;
a first index assembly at the rear of said frame to bias said inner shaft into a plurality of stable positions at each of which said first magnet is located adjacent one of said locations for switches of said second group; and
a second index assembly at the front of said frame to bias said outer shaft into a plurality of stable positions at each of which said second magnet is located adjacent one of said locations for switches of said first group.

5. A rotary switching mechanism comprising:
a first group of magnetically-actuated switches, each of said switches being located at one of a plurality of locations equally spaced circumferentially around a central axis equidistant from and parallel with said axis, each switch of said first group being positioned for actuation by magnetic means in a first plane perpendicular to said axis;
a second group of magnetically-actuated switches, each switch of said second group being located at one of a plurality of locations equally spaced circumferentially from said axis equidistant from and parallel with said axis, each switch of said second group being positioned for actuation by magnetic means in a second plane perpendicular to said axis and longitudinally spaced from said first plane, the locations for switches of said second group being positioned equal circumferential distances from the two adjacent locations for switches of said first group;
first magnet means rotatable around said axis in said first plane to actuate switches of said first group; and
second magnet means rotatable around said axis in said second plane to actuate switches of said second group.

6. Means for actuating a plurality of electrical circuits comprising:
a plurality of switches having magnetic actuation means positioned toward one end thereof, said switches positioned alternately head to tail, closely spaced in a circular pattern and said magnetic actuation means of alternate switches being positioned in a first plane perpendicular with a central axis and the magnetic actuation means of the remainder of said switches being positioned in a second plane perpendicular to said axis, longitudinally spaced from said first plane;
means to revolve a first magnet in said first plane in said circular pattern to operate said alternate switches; and
means to revolve a second magnet in said second plane in said circular pattern to operate said remainder of said switches.

7. Means for individually actuating a plurality of circuits comprising:
a plurality of switches having magnetic actuation means positioned toward one end thereof, said switches positioned within a circular pattern around an axis so that said switches are so positioned in said pattern that switches in adjacent locations have their magnetic actuation means spaced longitudinally with respect to said axis while switches in alternate locations have their magnetic actuation means aligned with respect to a plane perpendicular said axis and said switches being positioned in two groups, switches of the first groups having their magnetic actuation means aligned with respect to a first plane perpendicular with said axis and the remainder of said switches having their magnetic actuation means aligned with respect to the second plane perpendicular with said axis longitudinally spaced from said first plane;
means to revolve a first actuated magnet within said circular pattern in said first plane to actuate switches in said first group of switches in alternate locations;
means to revolve a second actuating magnet within said circular pattern in said second plane to actuate said remainder of said switches.

References Cited in the file of this patent

UNITED STATES PATENTS

| | | |
|---|---|---|
| 2,922,994 | Kennedy | Jan. 26, 1960 |
| 2,932,699 | Reese | Apr. 12, 1960 |
| 2,932,703 | Haberland | Apr. 12, 1960 |
| 2,935,583 | Howell | May 3, 1960 |
| 2,945,931 | Reese | July 19, 1960 |
| 2,980,777 | Howell et al. | Apr. 18, 1961 |
| 2,988,616 | Reese | June 13, 1961 |
| 2,999,914 | Stanaway | Sept. 12, 1961 |
| 3,013,137 | Vanden Broeck | Dec. 12, 1961 |